Oct. 11, 1955
C. W. SHERWIN
2,720,645
OFF-CENTERED PLAN POSITION INDICATOR SYSTEM
Filed Sept. 14, 1945
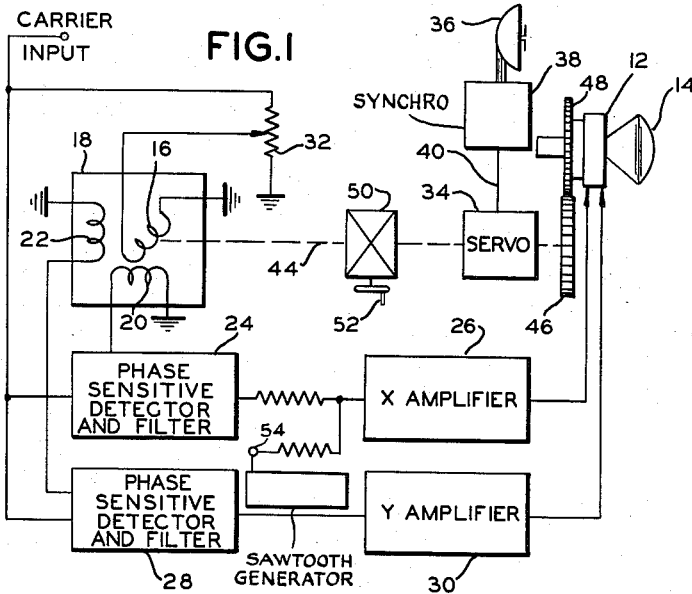
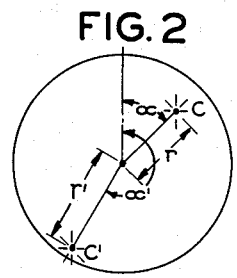
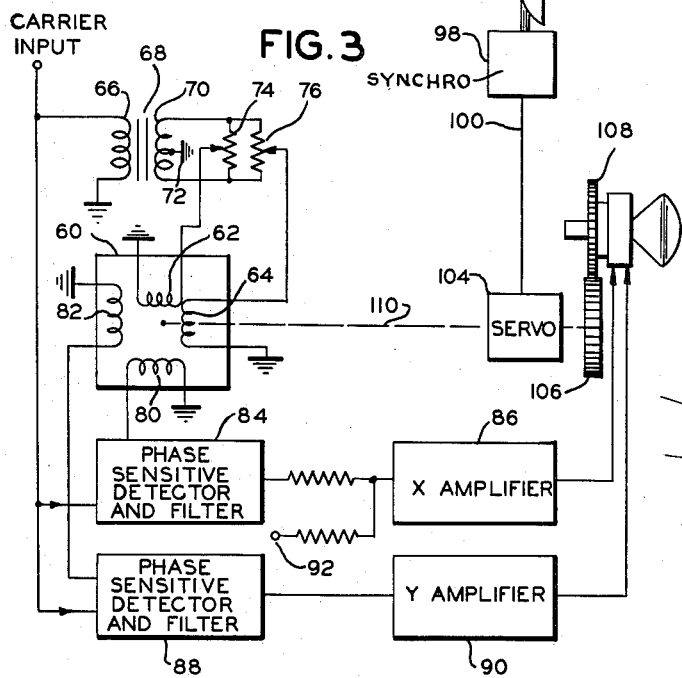
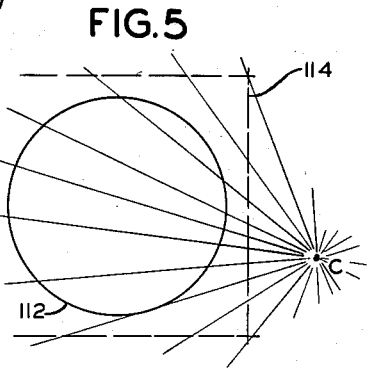
INVENTOR
CHALMERS W. SHERWIN
BY Ralph L Chappell
ATTORNEY

United States Patent Office 2,720,645
Patented Oct. 11, 1955

2,720,645

OFF-CENTERED PLAN POSITION INDICATOR SYSTEM

Chalmers W. Sherwin, Belmont, Mass., assignor, by mesne assignments, to the United States of America as represented by the Secretary of the Navy Application September 14, 1945, Serial No. 616,393

4 Claims. (Cl. 343—10)

This invention relates to radio pulse-echo systems for object detection and ranging, especially of the plan position indicator type (commonly abbreviated "P. P. I."), and relates more particularly to off-center P. P. I. systems.

The primary object of the invention is to generally improve P. P. I. systems of the offset center type.

Off-center P. P. I. systems are already known, but the methods heretofore used to obtain the off-center P. P. I. indication introduces certain disadvantages. For example, the use of axially displaced deflection coils spoils the focus of the beam. Stationary deflection coils produce a pattern which is less accurate than that obtained when using a single rotating coil system for radial sweep.

One object of the present invention is to overcome the foregoing difficulties, and to obtain an off-center P. P. I. indication while using only a single rotating deflection coil assembly.

In accordance with further features and objects of the present invention, the displacement of the P. P. I. sweep center from the screen center is made readily adjustable by manual means, and this adjustment may be made in accordance with either polar coordinates, or by slightly different apparatus, in accordance with Cartesian or rectangular coordinates.

To accomplish the foregoing general objects, and other more specific objects which will hereinafter appear, my invention resides in the method and circuit elements and their relation one to the other, as are more particularly described in the following specification. The specification is accompanied by drawings in which:

Fig. 1 is a schematic diagram of a P. P. I. system embodying features of my invention;

Fig. 2 shows how the location of the center of the P. P. I. pattern is adjustable in accordance with polar coordinates;

Fig. 3 is a schematic diagram of a modified P. P. I. system in which the location of the center is adjustable in accordance with rectangular coordinates;

Fig. 4 is explanatory of the circuit shown in Fig. 3; and

Fig. 5 illustrates one advantage of the invention.

Referring to the drawing, and more particularly to Fig. 2, the offset center of the P. P. I. representation is indicated at C, which in terms of polar coordinates, is offset by radius $r$ at the angle $\alpha$. In accordance with the present invention, the desired radial sweep about the center C is obtained by means of a single rotatable yoke or deflection coil assembly, and referring to Fig. 1 this deflection coil assembly is indicated at 12, and is rotatable about the cathode ray tube 14. In broad terms, my invention supplies such currents to the coils in the coil assembly 12 as will move the spot on a circle, and the coil 12 is simultaneously mechanically rotated at equal speed in opposite direction, thus maintaining the spot stationary. By superimposing a saw-tooth wave on the current energizing one axis of the deflection coil 12, a radial sweep about the offset center is obtained.

Considering the arrangement more specifically, the deflection coil assembly 12 is preferably so wired as to make it possible to deflect the beam in two mutually perpendicular directions. Such a deflection coil assembly may be referred to as an $x$—$y$ deflection coil. By placing properly phased sine and cosine currents on the $x$ and $y$ coils respectively, the beam may be rotated about the axis of the tube. One method of obtaining the desired sine and cosine current values is illustrated in Fig. 1. The rotor 16 of a synchro generator or rotary transformer 18 is supplied with a reference signal or carrier, which in simplest form may be ordinary 60 cycle A. C., but is preferably of higher frequency. The field coils or stator coils 20 and 22 have mutually perpendicular axes. The output of coil 20 is rectified in a conventional phase-sensitive detector 24, and the resulting demodulation current is amplified at 26, and supplied through appropriate brushes and slip rings to the $x$ coil of assembly 12. Similarly the output of stator coil 22 is rectified in a phase-sensitive detector 28, and the resulting demodulation current is amplified by amplifier 30 and supplied through appropriate brushes and slip rings to the $y$ coil of assembly 12.

When the rotor 16 of the synchro generator 18 is turned, the amplitude of the carrier fed to detector 28 varies in accordance with the sine of the rotation angle, and the amplitude of the carrier fed to the detector 24 is modulated in accordance with the cosine of the rotation angle. In consequence, the detector outputs will vary in accordance with the sine and cosine, and the spot on the screen of the cathode ray tube will reproduce the rotation of the synchro.

The radius at which the spot rotates will be determined by the amplitude of the sine and cosine currents, which may be most conveniently controlled by varying the amplitude of the carrier supplied to the synchro rotor 16. In the present case this is done by means of a potentiometer 32.

It will be evident that if the deflection coil 12 is rotated in opposite direction at equal speed the spot will remain stationary, and this is accomplished in the present case by direct mechanical coupling between the servo mechanism 34 and synchro generator 18. The servo mechanism 34 may be of conventional character, it being coupled to an antenna system 36 having any usual driving motor and synchro generator 38 connected by appropriate wiring indicated at 40 to a conventional control transformer forming part of the servo torque amplifier system 34. The mechanical connection between servo 34 and synchro generator 18 is indicated by the broken line 44, while the mechanical connection to the deflection coil 12 is indicated by the gears 46 and 48.

In Fig. 2 the adjustment of the location of the center C, for example to change the center of the P. P. I. pattern from the point C to the point C', requires adjustment not only of the radius from $r$ to $r'$ but also the angle from $\alpha$ to $\alpha'$. The latter adjustment may be obtained by disposing a differential gear mechanism 50 in shaft 44 between the servo mechanism 34 and the synchro generator 18. The normally stationary part of the differential gear mechanism may be turned under manual control, as by means of the handle 52, thereby changing the angular relationship between the two sides of the differential gear mechanism.

To obtain the desired radial sweep about the offset center it is merely necessary to supply a pulse-frequency saw-tooth deflection wave to either the $x$ coil or the $y$ coil of the $x$—$y$ coil assembly. In the present case the saw-tooth deflection wave is shown applied to the $x$ coil, it being fed at 54 to the input of the amplifier 26.

Referring now to Fig. 4, it will be seen that the offset center C is located in terms of rectangular coordinates $x$ and $y$, and that when the P. P. I. pattern is shifted to a new center point C', the shift is made by changing the x coordinate to x' and the y coordinate to y'. A manual control which produces such a change in rectangular coordinates may be more convenient in some cases than a manual control working in accordance with polar coordinates.

A modified circuit which affords this type of control is illustrated in Fig. 3. In this arrangement, the rotor of the synchro generator 60 which supplies the sine and cosine currents for the x—y deflection coil differs from that previously described in having two windings with mutually perpendicular axes, as indicated at 62 and 64. Such a device is sometimes called a "resolver." The reference current or carrier is supplied to the primary 66 of a transformer 68 having a secondary 70 the mid point of which is grounded as indicated at 72. A potentiometer 74 has its sliding contact connected to the coil 62, and it will be evident that the amplitude of the carrier supplied to coil 62 may be varied from zero, at the middle of the potentiometer, to maximum amplitude in either of the two opposite phases, corresponding to either plus or minus values of x, as illustrated by x and x' in Fig. 4. Another potentiometer 76 is connected across the secondary 70 of transformer 68 and its sliding contact is connected to the rotor coil 64. Here also the input current value may be varied from zero at the mid point to a maximum on either side, corresponding to either plus or minus values of y, as illustrated by y or y' in Fig. 4.

The stator coils 80 and 82, the phase-sensitive detector 84 and its amplifier 86 for the x deflection, and the phase-sensitive detector 88 and its amplifier 90 for the y deflection, all correspond to the similar circuit elements previously described in connection with Fig. 1. A sawtooth sweep is fed into one of the amplifiers, in this case the amplifier 86, as is indicated at 92. The antenna 94, the synchro generator 98, wiring 100, the servo mechanism 104, and the gears 106 and 108, all correspond to the similar parts previously described. In this case, of course, there is no need for the differential gear mechanism, and instead the servo mechanism 104 is connected directly to the synchro generator 60 by means of a shaft schematically represented at 110. In all cases the wiring to the yoke, and the gearing for mechanical rotation, are so related as to produce rotations in opposite directions.

One advantage of the present invention is that it is practicable to displace the center far off the screen. This is illustrated in Fig. 5, in which the center C is displaced well outside the screen 112. Ordinarily this would involve excessive voltages and waste of power, and would injure the focus of the electron beam. With the present arrangement, however, in which the saw-tooth voltage and the off-center voltage are added together in an amplifier (instead of having separate successive deflecting fields, for example) these difficulties are avoided because the output of the amplifier may be limited to a value which will deflect the spot just outside the screen of the tube, as indicated for example by the broken lines 114 in Fig. 5. As long as the amplifier operates properly when the beam is inside the dotted lines the equipment works correctly.

It is believed that the construction and operation of my improved off-center P. P. I. system, as well as the advantages thereof, will be apparent from the foregoing detailed description. One advantage is that when the center is not displaced the operation of the system is exactly the same as when using a simple rotating coil P. P. I., and produces the same high quality pattern. This pattern is superior in accuracy to that obtainable when using fixed coil P. P. I. systems. Another advantage is that the use of only one deflection coil system of fairly low inductance makes it possible to obtain fast starting sweeps with a short recovery time. Another important advantage of using a single deflection coil assembly is that good focus of the beam is obtainable and is preserved throughout the deflection of the spot over the screen. Still another advantage is that a fixed deflection far off the screen of the tube is available in a practical way, without requiring excessive potentials and waste of power and without spoiling the focus of the electron beam.

It will be apparent that while I have shown and described my invention in several preferred forms, many changes may be made in the circuits described without departing from the spirit of the invention as sought to be defined in the following claims.

In the specification and in the claims it has been assumed for convenience that the spot is moved in either polar or rectangular coordinates. It will be understood, however, that in the latter case the coordinates may be at an angle other than 90°, provided that the yoke coils are properly disposed for the new angle, and provided that the sine waves are properly displaced in phase for the new angle. In many of the claims the reference to rectangular or Cartesian coordinates is intended merely to differentiate from polar coordinates, rather than to limit to a perpendicular relation. It will therefore be understood that the definition in terms of rectangular coordinates is merely for clarity and convenience, and is not intended to be in limitation of the invention.

I claim:

1. In a radar system having a cathode ray tube adapted for plan-position indication, means for off-centering said indication comprising, a rotatable coil assembly surrounding the neck of said tube, means for rotating said coil assembly, a source of alternating voltage, means for altering said alternating voltage as a function of the instantaneous position of said rotatable coil, a saw-tooth wave generator and means for applying the outputs of said altering means and said saw-tooth wave generator to said coil assembly.

2. In a radio detection system having a cathode ray tube adapted for plan-position indication, means for off-centering said indication to provide a radial sweep about a point offset from the geometric center of said tube comprising, a servomechanism, a rotatable coil assembly surrounding the neck of said tube and rotated by said servomechanism, a synchro generator also driven by said servomechanism, a source of alternating voltage, said voltage being modulated by the output of said synchro generator and applied to said coil assembly, and a sawtooth wave generator having its output also applied to said coil assembly.

3. In a radio detection system having a cathode ray tube adapted for plan-position indication, a circuit for off-centering said indication to provide a radial sweep about a point offset from the geometric center of said tube comprising, a servomechanism, a rotatable deflection coil assembly surrounding the neck of said tube and rotated by said servomechanism, a synchro generator having rotor and stator coils, said rotor coil being driven by said servomechanism, a variable source of alternating voltage connected to the rotor coil of said synchro generator, a detecting and filtering circuit connected to the stator coils of said synchro generator, a saw-tooth wave generator, and means for applying the outputs of said sawtooth wave generator and said detecting and filtering circuits to said deflection coil assembly.

4. In a radar system, the combination of a cathode ray tube adapted for plan-position-indication and an off-centering circuit for providing a radial sweep about a point offset from the center of said tube comprising, a servomechanism, a rotatable deflection coil assembly surrounding the neck of said tube and rotated by said servomechanism, a synchro generator having stator coils and a rotor coil, said rotor coil being mechanically rotated by said servomechanism, a variable source of alternating voltage connected to said rotor coil, a detecting circuit connected to said source of alternating voltage and to said stator coils and responsive to phase differences between said alternating voltage and voltages from said stator coils, a saw-tooth wave generator, and means for applying the outputs of said detecting circuits and said saw-tooth wave generator to said deflection coil assembly.

References Cited in the file of this patent

UNITED STATES PATENTS

| | | |
|---|---|---|
| 2,263,377 | Busignies et al. | Nov. 18, 1941 |
| 2,313,966 | Poch | Mar. 16, 1943 |
| 2,400,791 | Tolson (2) | May 21, 1946 |
| 2,409,456 | Tolson et al. | Oct. 15, 1946 |
| 2,421,747 | Englehardt | June 10, 1947 |
| 2,489,251 | Anast | Nov. 29, 1949 |